Patented June 12, 1934

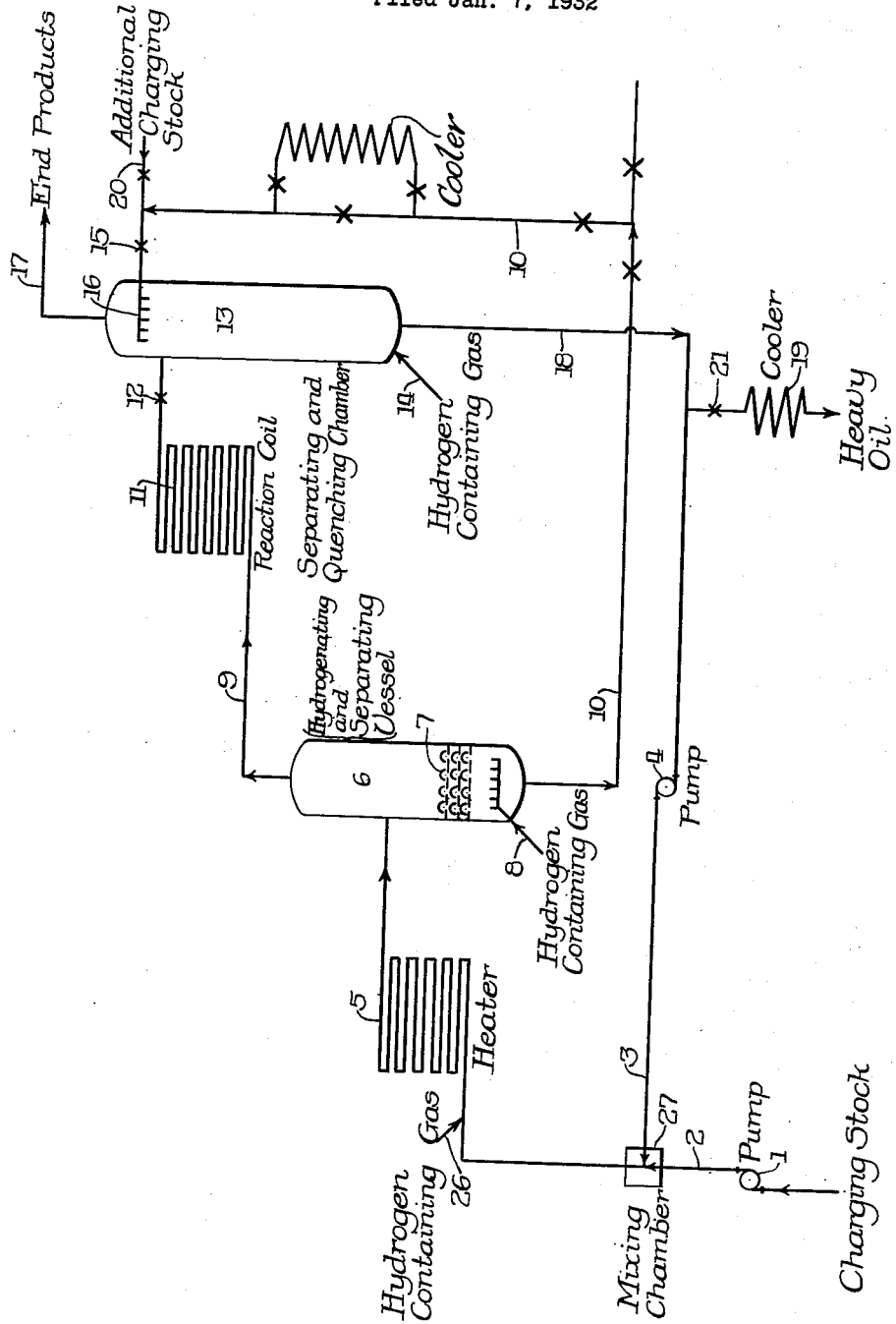

1,962,792

UNITED STATES PATENT OFFICE 1,962,792

PROCESS FOR THE HYDROGENATION OF HYDROCARBONS

Brown Van Voorhees, New York, N. Y., and Erich Steffen, Elizabeth, and Leon W. Parsons, Westfield, N. J.

Application January 7, 1932, Serial No. 585,261

6 Claims. (Cl. 196—53)

This invention relates to an improved method of destructively hydrogenating hydrocarbonaceous materials. The process is applicable to crude mineral oils, their distillation products and residues or the products and residues of any refining operation. It is also applicable to tars and pitches and any other distillation or hydrogenation products of these and similar materials as well as the coals themselves or their hydrogenation products, if they have been prepared in a fluid or pumpable form. In this process the hydrogen may be supplied by relatively pure hydrogen gas or by gases containing hydrogen in suitable quantities.

The primary object of this invention is to hydrogenate hydrocarbons in two definite stages of phases and temperature.

Another object of this invention is to hydrogenate the high boiling material at a low temperature in order that coke will not be formed.

It is also an object of this invention to hydrogenate the lighter oils, such as the gas oil formed or introduced, at higher temperatures in order to insure the formation of an anti-knock gasoline.

It is an object of this invention to effect a separation between the high boiling material and the lower boiling material after the first hydrogenating stage by the use of heated hydrogen containing gas as a stripping agent.

It is a further object of this invention to control the time element of the high temperature reaction by quenching the hot vapors and gases from this reaction by a relatively cool oil.

It is a final object of this invention to utilize the liquid material recovered from the first hydrogenating stage with or without cooling or admixture with the untreated oil as the quenching medium.

The raw materials for which this invention is particularly adapted are heavy gas oils, fuel oils or crudes from which the gasoline has been removed. By treatment according to this invention the heavy raw materials and other heavy materials recovered from a later stage in the process are hydrogenated under relatively mild temperature conditions so that the danger of coke formation and its concomitant operating difficulties are eliminated.

After this preliminary treatment in which mainly gas oils are formed, the gas oils and lower boiling materials are separated from the unchanged heavy oil which remains liquid and from which the last traces of the lighter materials may be removed by the stripping action of a hydrogen containing gas introduced under the surface of the liquid.

This hydrogen containing gas need not be of the same composition as the hydrogen containing gas used in the preceding hydrogenating stage. It may be considerably poorer in hydrogen and may be recovered from a subsequent step in the process as a portion of the gas formed by the process, being recovered as a fraction by a step with pressure release. The gases and vapors are then treated at high temperatures in a further hydrogenating step in order to form highly aromatized compounds and then are quickly cooled in order that the cracking reaction will not go too far with the consequent formation of uneconomic quantities of gas by the materials remaining liquid after the first hydrogenation treatment.

In order to describe the invention in more detail, the operation will be explained, with reference to the accompanying diagram:—

The raw material to be charged to this process is introduced into pipe (2) by pump (1) where it meets the heavy material recovered at a later stage in the process, from container (13), which is introduced through pipe (3) by pump (4). A mixing chamber (27), may be included at this point to assure a uniform stock for charging to heater coil (5). Before the oil enters the heater, hydrogen containing gas may be introduced at point (26). The heater (5), which may be of any suitable design, but which is preferably of the convection type, the oil and any hydrogen-gas are maintained at high velocity and heated as quickly as possible to a temperature between 350° C. and 460° C. The heated material is then discharged from the heater and enters the hydrogenating and separating vessel (6) and the oil which has been vaporized together with the introduced hydrogen-containing gas leave through pipe (9). In the separator, fractionating or bubble cap trays (7) may be arranged and these are primarily designed to serve as a stripping section for the liquid, the stripping agent being a pre-heated hydrogen-containing gas introduced at (8). These may support catalytic masses or be composed of catalytic materials. It may also be desirable to include baffles or fractionating trays at the top of the separating vessel in order to prevent any entrainment of heavy materials to the high temperature heater or reaction coil (11).

In this reaction coil the gases are raised to a high temperature, between 470° and 580° C.

so that extensive cracking and benzol formation take place. After the heating, the vapors may pass through a control valve (12) and enter quenching chamber (13) where they encounter the liquid withdrawn from separating chamber (6) through pipe (10) which reduces the temperature of the superheated vapors from heater (11) and prevents the cracking reaction from proceeding too far and forming uneconomic quantities of fixed gases.

At some conditions of temperature and pressure it may not be feasible to operate a control valve at (12) and instead it may be necessary to control only with valve (15) and/or with a circulating pump in line (10). Besides serving as a quencher this chamber also serves as a reaction chamber and some of the liquid material introduced through the spray header (16) is destructively hydrogenated in the main body of the chamber by the heated hydrogen-containing gas which is introduced at (14) and bubbled through the liquid, forming light products which are taken off through pipe (17) along with the materials formed in heater (11). The heavy oil which remains liquid is withdrawn through pipe (18) and taken up by pump (4) to recycle through the system. In order to prevent any heavy material from building up in the system some of the recirculated stock may be withdrawn from pipe (18) by means of valve (21) and discharged through cooler (19). In some cases it is desirable to introduce a colder oil than that withdrawn from vessel (6) so that only gases and motor fuel vapors leave by pipe (17) and in such a case the raw material may be introduced through pipe (20) along with the oil from vessel (6) in order to maintain the desired temperature in vessel (13). Another method possible of accomplishing this temperature control is by inserting a heat exchanger not shown, so that the oil leaving vessel (6) gives up heat to the cool raw material either before or after pump (1). The raw material may also be preheated by exchange with the products leaving by pipe (17) during the course of their subsequent fractionation and condensation.

The hydrogen-containing gas separated from the end products may be reintroduced into the process after suitable treatment when necessary for the removal of sulphur compounds and fixed hydrocarbon gases.

In the treatment of some oils it is desirable to hydrogenate in the presence of catalysts and in the first stage is is possible to fix the catalyst rigidly in the heating coil and/or the separating vessel (6) or it may be possible to utilize a catalyst dissolved or suspended in the oil introduced in the unit. The catalyst may thus be circulated through the first hydrogenating stage and also admitted to vessel (13) with the quenching medium. As the catalyst loses its activity it may be withdrawn with the oil at valve (21) as fresh catalyst is introduced with the untreated oil. It is also possible to fix a catalyst rigidly in the secondary heating coil and/or quenching vessel (13) which need not be the same type of catalyst used in the first stage.

During the fractionation of products leaving by pipe (17) a gas oil may be recovered depending on the temperature maintained in vessel (13). This material is suitable for reintroduction into the process and may be introduced with the raw material at pump (1) or alone or admixed with the raw material at point (20) for purposes of temperature control or into vessel (6) either relatively cool or after being heated to a suitable temperature.

While it is not desired to fix the operating temperatures of this process exactly, the approximate temperatures which will obtain in this process are as follows: In the low temperature stage the temperature will be from 350° to 460° C. while in the high temperature stage the temperature will be from 470 to 580° C. and the pressures will be of the order of 100 to 500 atm. In some hydrogenations it may be desirable to maintain a higher pressure in the low temperature stage in order to prevent coke deposition from the heavy oils than in the low temperature stage and pressures 100 atm. or more higher than those maintained in the high temperature stage may be desirable but this process is not limited to definite pressures and temperatures.

Two definite variables must be considered with respect to reaction time, these being the temperatures at which the materials are treated and the nature of the raw materials themselves. In the low temperature stage the susceptibility to hydrogen fixation and the extent of hydrogenation necessary are controlling factors. These factors are determined by the nature of the raw material and the amount of unsaturation in this raw material. In the second stage the rate at which the cracking or formation of light hydrocarbons takes place is controlling and the temperature and reaction time are determined by the susceptibility of the materials to this cracking reaction.

In the second stage, for instance, materials naphthenic in nature may be cracked at relatively low temperatures to form anti-knock gasoline, that is at temperatures at the lower end of the range described above, while materials paraffinic in nature require more than the splitting reaction and consequently must be treated at higher temperatures in order to reform or change the general type of the low boiling product from paraffinic to aromatic. For a fuel oil, for example, the reaction time in the low temperature stage should be in the order of two hours at 380° to 390° C., while at the upper limit of the low temperature range the time would be thirty minutes or possibly even less. Similarly in the high temperature stage the reaction time may vary considerably, being in the order of thirty minutes or less at the low temperature end of the range or at the high temperature end of the range the time may be in the order of a fraction of a minute to several minutes.

The proportion of hydrogen present plays an important role in the low temperature stage where saturation of highly unsaturated bodies is sought. The important point is the maintenance of the hydrocarbon and the hydrogen containing gas so intimately mixed that polymerization will not take place. As an example, in a low temperature stage operated at 390° C. a volume of one thousand cubic feet of hydrogen containing gas measured under normal conditions per cubic foot of hydrocarbon liquid is satisfactory. In the high temperature stage the importance of the proportion of hydrogen is less, since here the function of the hydrogen is to prevent the polymerization to tar of the highly unsaturated bodies formed by the cracking, by saturating these bodies before any substantial polymerization takes place. Since the extent of the cracking is carefully controlled

We claim:

1. A process for the continuous destructive hydrogenation of high boiling hydrocarbons at pressures in excess of 100 atm. in the presence of a hydrogen containing gas in a low temperature stage at temperatures between 350° C. and 460° C. and a high temperature stage at temperatures between 470° C. and 580° C. in which the products from the low temperature stage are separated into vapor and liquid, the vapor passing to the high temperature stage of hydrogenation where the reacting materials are heated in a restricted stream to the treating temperatures without extensive polymerization to coke forming materials after which it is quickly cooled by quenching by intimate admixture with the liquid recovered after the low temperature stage of hydrogenation, in a vessel from which the vaporous products of reaction are withdrawn as end products and the liquid materials are recycled to the low temperature stage.

2. A process for the continuous destructive hydrogenation of high boiling hydrocarbons at pressures in excess of 100 atm. in the presence of a hydrogen containing gas in a low temperature stage at temperatures between 350° C. and 460° C. and a high temperature stage at temperatures between 470° C. and 580° C. in which the products from the low temperature stage are separated into vapor and liquid, the vapor passing to the high temperature stage of hydrogenation where the reacting materials are heated in a restricted stream to the treating temperatures without extensive polymerization to coke forming materials after which it is quickly cooled by quenching by intimate admixture with the liquid recovered after the low temperature stage of hydrogenation after suitable cooling, in a vessel from which the vaporous products of reaction are withdrawn as end products and the liquid materials are recycled to the low temperature stage.

3. A process for the continuous destructive hydrogenation of high boiling hydrocarbons at pressures in excess of 100 atm. in the presence of a hydrogen containing gas in a low temperature stage at temperatures between 350° C. and 460° C. and a high temperature stage at temperatures between 470° C. and 580° C. in which the products from the low temperature stage are separated into vapor and liquid, the vapor passing to the high temperature stage of hydrogenation where the reacting materials are heated in a restricted stream to the treating temperatures without extensive polymerization to coke forming materials after which it is quickly cooled by quenching by intimate admixture with the liquid recovered after the low temperature stage of hydrogenation after admixture with relatively cool untreated raw material, in a vessel from which the vaporous products of reaction are withdrawn as end products and the liquid materials are recycled to the low temperature stage.

4. A process for the continuous destructive hydrogenation of high boiling hydrocarbons at pressures in excess of 100 atm. in the presence of a hydrogen containing gas in a low temperature stage at temperatures between 350° C. and 460° C. and a high temperature stage at temperatures between 470° C. and 580° C. in which the products from the low temperature stage are separated into vapor and liquid by bubbling hydrogen containing gas through the liquid, the vapor passing to the high temperature stage of hydrogenation where the reacting materials are heated in a restricted stream to the treating temperatures without extensive polymerization to coke forming materials after which it is quickly cooled by quenching by intimate admixture with the liquid recovered after the low temperature stage of hydrogenation, in a vessel from which the vaporous products of reaction are withdrawn as end products and the liquid materials are recycled to the low temperature stage.

5. A process for the continuous destructive hydrogenation of high boiling hydrocarbons at pressures in excess of 100 atm. in the presence of a hydrogen containing gas in a low temperature stage at temperatures between 350° C. and 460° C. and a high temperature stage at temperatures between 470° C. and 580° C. in which the products from the low temperature stage are separated into vapor and liquid by bubbling hydrogen containing gas through the liquid, the vapor passing to the high temperature stage of hydrogenation where the reacting materials are heated in a restricted stream to the treating temperatures without extensive polymerization to coke forming materials after which it is quickly cooled by quenching by intimate admixture with the liquid recovered after the low temperature stage of hydrogenation after suitable cooling, in a vessel from which the vaporous products of reaction are withdrawn as end products and the liquid materials are recycled to the low temperature stage.

6. A process for the continuous destructive hydrogenation of high boiling hydrocarbons at pressures in excess of 100 atm. in the presence of a hydrogen containing gas in a low temperature stage at temperatures between 350° C. and 460° C. and a high temperature stage at temperatures between 470° C. and 580° C. in which the products from the low temperature stage are separated into vapor and liquid by bubbling hydrogen containing gas through the liquid, the vapor passing to the high temperature stage of hydrogenation where the reacting materials are heated in a restricted stream to the treating temperatures without extensive polymerization to coke forming materials after which it is quickly cooled by quenching by intimate admixture with the liquid recovered after the low temperature stage of hydrogenation after admixture with relatively cool untreated raw material, in a vessel from which the vaporous products of reaction are withdrawn as end products and the liquid materials are recycled to the low temperature stage.

BROWN VAN VOORHEES.
ERICH STEFFEN.
LEON W. PARSONS.